United States Patent [19]
Dowden

[11] Patent Number: 5,651,660
[45] Date of Patent: Jul. 29, 1997

[54] DUMPER INSTALLATIONS

[75] Inventor: Paul John Dowden, Almondsbury, Great Britain

[73] Assignee: Strachan & Henshaw Limited, Bristol, England

[21] Appl. No.: 629,064

[22] Filed: Apr. 8, 1996

[30]     Foreign Application Priority Data

Apr. 19, 1995 [GB] United Kingdom ............... 9507981

[51] Int. Cl.⁶ ........................................ B65G 67/42
[52] U.S. Cl. ............................... 414/359; 414/371
[58] Field of Search .......................... 414/358–361, 414/371, 372

[56]     References Cited

U.S. PATENT DOCUMENTS

| 477,396 | 6/1892 | Wilson | 414/360 |
|---|---|---|---|
| 1,301,208 | 4/1919 | Wood | 414/359 X |
| 3,528,571 | 9/1970 | Reid et al. | 414/361 |
| 4,432,688 | 2/1984 | Schmidt | 414/358 |
| 4,479,749 | 10/1984 | Binzen | 414/359 X |
| 5,017,077 | 5/1991 | Dowden | 414/360 |
| 5,046,912 | 9/1991 | Bostrom et al. | 414/358 |
| 5,567,105 | 10/1996 | Williams | 414/360 |

*Primary Examiner*—David A. Bucci
*Attorney, Agent, or Firm*—Jones, Tullar & Cooper P.C.

[57]     ABSTRACT

To permit coupled rail cars of different lengths be tipped in a rail car dumper installation, between a rail car platform of the tipping structure and a fixed track section leading to the platform there is a space occupied by a supplementary rail section that can be secured relative to the rail car platform or the fixed track section respectively. The tipping structure has a cranked portion overlapping said supplementary rail section to engage end supports for the associated end of the tipping structure.

7 Claims, 3 Drawing Sheets

5,651,660

DUMPER INSTALLATIONS

BACKGROUND OF THE INVENTION

This invention relates to rail car dumper installations and in particular to installations employing rotary dumpers such as are used for discharging bulk material from rail cars by tipping.

It is normally required to operate a rail car dumper without uncoupling each rail car from the train of rail cars being discharged by the dumper. The use of standard size rail cars with couplings that allow the rotation of each car of the coupled train in turn is now widespread, therefore. There are a number of different standard sizes of rail cars, however, and although it is usually possible to ensure that the rail cars of a train are all of the same size, it may be more difficult to arrange that all the trains supplying a particular installation have rail cars of the same standard size. Some variation of the transverse dimensions of the rail cars can be tolerated, especially if they are constructed to the same rail gauge, but problems can arise if they differ in length. The length dimension of the dumper is critical as it must be matched to the distance between the end couplings of each rail car.

U.S. Pat. No. 5,017,077 describes a rail car dumper which is adapted to accommodate two different lengths of rail car. The tipping structure has a rail car platform projecting through supporting rotary frames at opposite ends of the dumper tipping structure. Beyond the supporting frame at one end the platform has a hinged extension which carries a rail track section reaching to the fixed rail track leading to the tippler structure. When the longer of the two types of rail car is to be tipped, it is supported upon the rail car platform with the hinged section extended. When the shorter rail car is to be received, the hinge section is folded down and an alternative hinged section on the fixed installation is put in its place as an extension of the fixed rail track.

Apart from the fact that this is a relatively complex arrangement, it has the disadvantage that the end frame adjacent the hinged rail sections is within the length of the longer rail cars which require the extension of the rail car platform. It is exposed to the material discharged during tipping therefore, resulting in a high rate of wear from abrasion, and possibly damage to the tipping structure.

SUMMARY OF THE INVENTION

According to the present invention, in a rail car dumper installation comprising a tipping structure mounted for rotation on opposite end supports, a rail car platform on the tipping structure carrying a rail track section to receive a rail car to be tipped by rotation of the structure on said supports, and fixed rail track sections at opposite ends of the tipping structure with which said platform rail track section can be aligned for the movement of the rail car onto and from the platform, at least one end of the platform terminates within the span of said end supports and at a spacing from the adjacent fixed rail track section, and a supplementary rail track section is alternatively securable relative to the rail car platform at said one end or to the adjacent fixed track section to bridge the spacing therebetween.

Preferably, the rotary end support at least at said one end is wholly or substantially located beyond the length of said supplementary rail section.

In a dumper installation in which the tipping structure comprises at least one longitudinal support member overlapping said supplementary rail section, it may be preferred to arrange that said support member is cranked radially outwardly with respect to the rotary tipping axis in the region of said overlap with the supplementary rail section. The space required for the main length of the tipping structure can thereby be kept to a minimum.

One embodiment of the invention is illustrated by way of example in the accompanying schematic drawings.

DESCRIPTION OF THE PREFERRED EMBODIMENT

Figure 1:
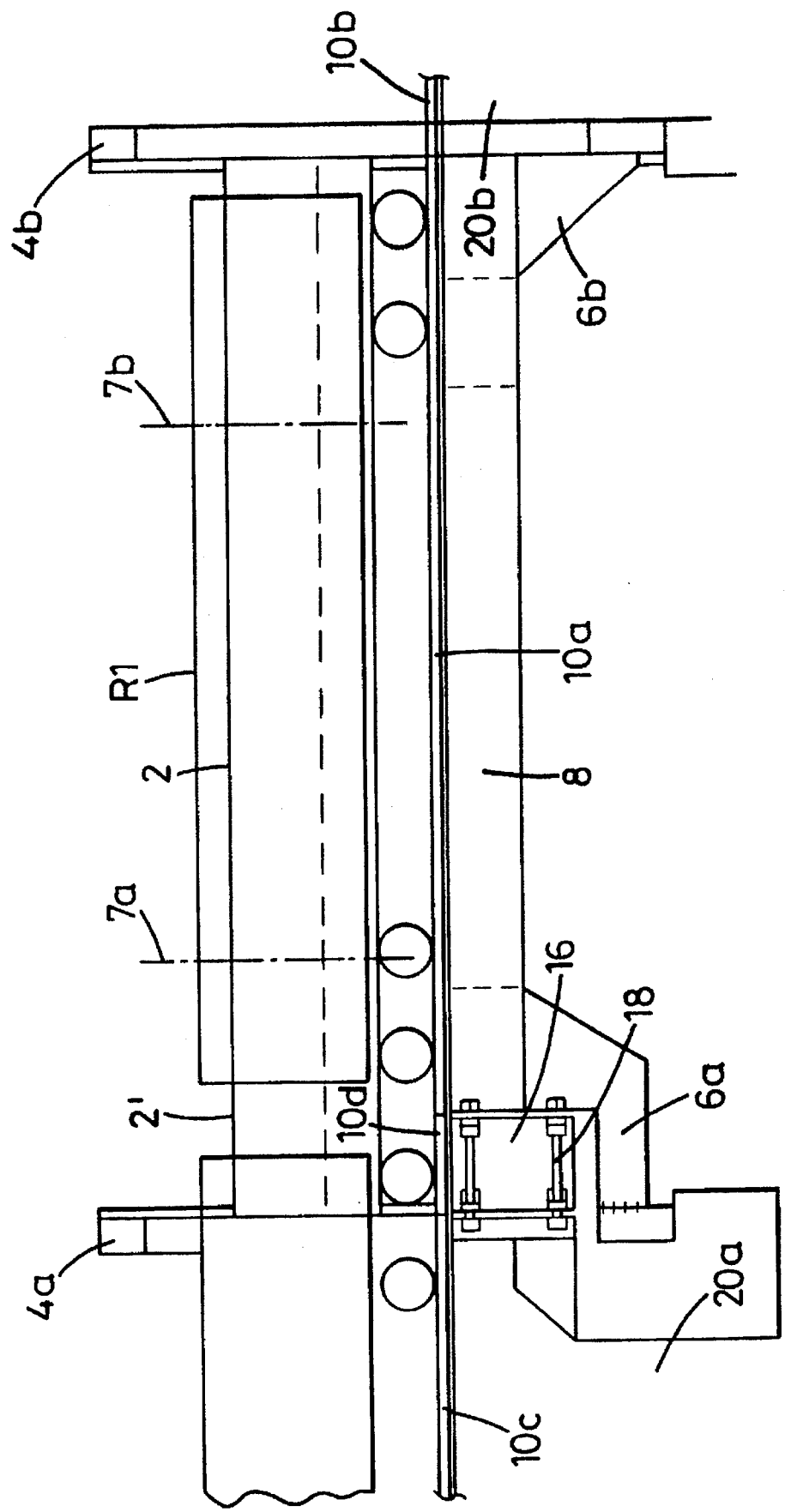
FIGS. 1 and 2 each show a side view of the rail car dumper with a supplementary track section at one end in its alternative modes of adjustment and illustrating two alternative sizes of rail car it accommodates.
Figure 2:
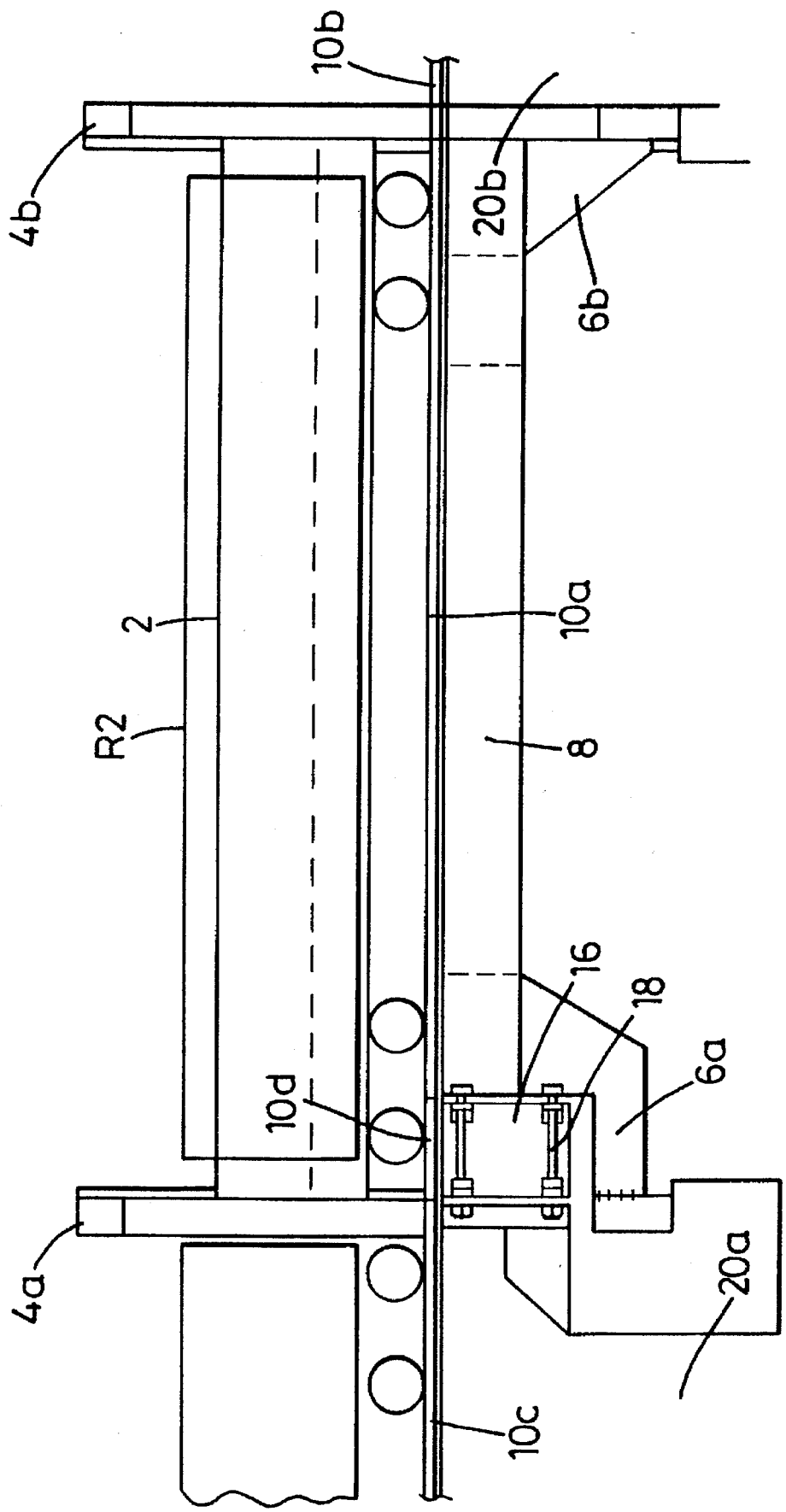

In FIGS. 1 and 2 a tipping structure of a rail car dumper is shown comprising a main side beam 2 extending the length of the structure and secured at opposite ends to similar ring frames 4a,4b which rest on fixed rollers (not shown) to allow the structure to rotate about the central longitudinal axis of the ring frames. Lower supports 6a,6b secured to the ring frames carry a rail car platform 8 on the tipping structure in known manner, for example as described in U.S. Pat No. 5,017,077 the contents of which are incorporated herein by reference. As is also known, top clamps for a rail car on the platform are mounted on the mainbeam 2 of the tipping structure, only their longitudinal locations being shown at references 7a,7b.

The rail car platform 8 comprises a rail track section 10a which, in the rest position of the tippler shown, is aligned with fixed rail track sections 10b,10c extending up to the ends of the dumper tipping structure. At one end of the dumper there is only a small working clearance between the platform 8 and the fixed rail section 10b. At the other end (on the left-hand side of FIGS. 1 and 2) there is a spacing between the platform and the fixed rail section 10c which is occupied by a supplementary rail track section 10d carried by a detachable support frame 16 to complete, with the sections 10a,10b,10c, an essentially continuous track for the trains, the contents of the rail cars of which are to be dumped. It will be noted that the adjacent end ring frame 4a is located immediately beyond the support frame 16, within the extent of the fixed rail track section 10c.

Releasable tie bolts 18 allow the support frame 16 to be attached alternatively to the rail car platform (as shown in FIG. 2) or to a fixed structure 20a on which the fixed rail track section rests (as shown in FIG. 1) and locking means such as wedges not shown) are provided to fix the support frame 16 in place in either alternative. Typically, the structures 20a,20b supporting the fixed rail track sections at both ends are part of the civil engineering works of the dumper installation.

In FIGS. 1 and 2 can be seen the outlines of two forms of rail car R1,R2 of different lengths in the dumper installation. In each case two coupled rail cars are indicated to illustrate their positions relative to the supplementary track section. When the shorter rail car R1 seen on the platform 8 in FIG. 1 is to be tipped, the supplementary rail section 10d is fixed in position because it must assist the support of the end bogie of the second rail car R1 on the fixed track section 10c. Conversely, when the longer rail car R2 shown on the platform 8 in FIG. 2 is to be tipped, the end bogie of the rail car overlaps onto the supplementary rail track section 10d which therefore must rotate with the rail car platform.

Accordingly, the detachable support frame 16 is released from the structure 20a but is fixed securely to the rail car platform. The different configurations are obtained by simply adjusting the bolts to link the supplementary section support to the fixed support or to the platform alternatively.

Figure 3:
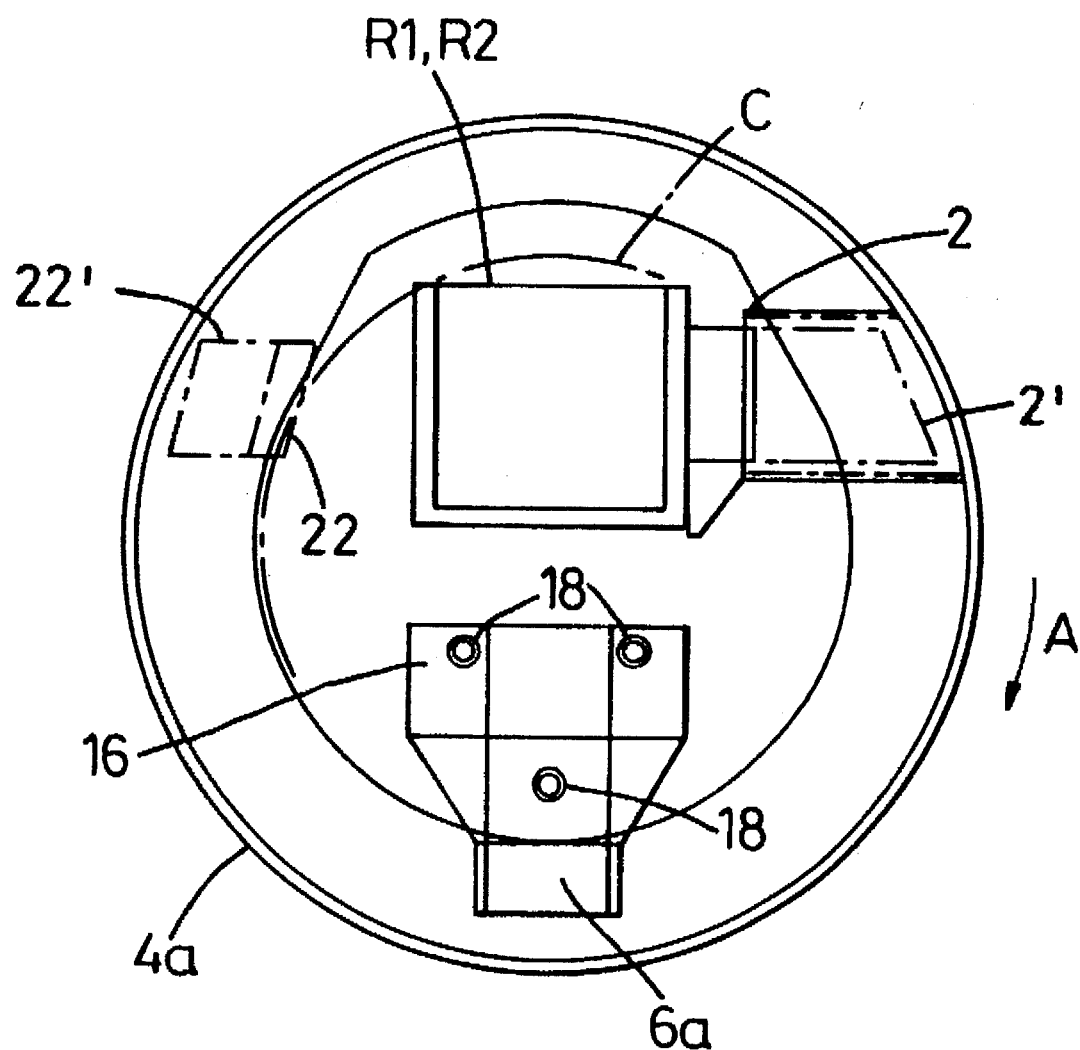
FIG. 3 is an end view of the dumper tipping structure.

The main beam 2 is located close to the rail cars, as can be seen in FIG. 3, in part to provide a side support for the rail cars as they are tipped in the direction of the arrow A. At the end of the platform 8 where the supplementary rail track section 10d and its support 16 are placed, it is necessary to form the main beam with an outwardly cranked portion 2' so as to prevent a clash as the structure is tipped when the supplementary section support 16 is fixed in position to the structure 20a. At the end of the tipping structure overlapping the supplementary section support, therefore, the main beam 2 is cranked radially outwardly with respect to the tipping axis, as shown in FIG. 3. The lower support 6a of the tipping structure similarly has a cranked form to extend below the support frame 16, as shown in FIGS. 1 and 2.

The illustrated example also shows a supplementary beam 22 of the tipping structure extending between the end frames and on the opposite side of the rail track from the main beam 2. In this example, the beam is similarly cranked at 22', although to a less extent, to prevent a clash when, with a train of the shorter rail cars R1, one rail car is stationary on the detachable support 16 during dumping of the adjoining rail car and so projects into the axial length of the tipping structure. FIG. 3 indicates by a broken line C the arcuate clearance space outside of which the supplementary beam 22 must lie, where it overlaps the supplementary rail section support, to avoid this clash.

What is claimed is:

1. A rail car dumper installation comprising:

a tipping structure, rotary supports for tipping said structure about a longitudinal axis, said structure having opposite end regions engaged with said rotary supports, a rail car platform on said tipping structure, said platform having a first and second ends mutually remote from each other in the direction of said longitudinal axis, a rail track section on said platform extending between said platform ends for receiving a rail car to be tipped by rotation of the tipping structure on said supports, first and second fixed rail track sections extending away from said first and second ends of the platform respectively, said platform rail track section being displaceable by said rotation of the tipping structure to and from a position of alignment with the respective fixed rail track sections, in said position of alignment the rail track section at said first end of the platform being at a spacing from said first fixed rail section, a supplementary rail section for bridging said spacing, releasable securing means for securing said supplementary section alternatively to the rail car platform at said one end for tipping said supplementary section therewith or to said associated fixed track section for maintaining said supplementary section fixed in place while said platform rail track section is tipped.

2. A rail car dumper installation according to claim 1 wherein the rotary support at said end region nearer to said first end of the rail track platform is located beyond said first end of the platform by at least substantially the length of said supplementary rail track section.

3. A rail car dumper installation according to claim 1 wherein the tipping structure comprises at least one longitudinal support member longitudinally overlapping said supplementary rail section, said longitudinal support member being cranked outwardly with respect to the longitudinal tipping axis for providing clearance from said supplementary rail track section during tipping movements when said supplementary section is fixed in place.

4. A rail car dumper installation according to claim 3 wherein said tipping structure adjacent said one end of the rail track platform comprises an element cranked outwardly with respect to the longitudinal tipping axis and extending longitudinally beyond the extent of the rail track platform for engagement with the associated rotary support.

5. A rail car dumper installation according to claim 1 wherein the tipping structure comprises at least one beam located above the level of the platform track section and having a longitudinally overlap with said supplementary rail section, along said overlap with said supplementary track section said beam being cranked outwardly with respect to the tipping axis of the structure.

6. A rail car dumper installation according to claim 1 wherein said securing means comprise bolting devices that extend parallel to the rail track sections.

7. A rail car dumper installation comprising:

a tipping structure, rotary ends supports engaging opposite ends of the tipping structure for tipping said structure about an axis of rotation extending longitudinally of the structure, a rail car platform on the structure, a rail track section of said platform extending parallel to said rotary axis to receive a rail car to be tipped by rotation of the structure about said axis, opposite ends of the rail track section being disposed within the extent of the tipping structure in the direction of said axis of rotation, respective fixed rail track sections extending away from said opposite end regions of the tipping structure, said platform rail track section being aligned with said fixed rail track sections in an upright state of the tipping structure, one said end of the platform rail track section being at a spacing from its associated fixed track section, a supplementary rail track section disposed between said one end of the platform rail track section and its associated fixed track section for bridging said spacing, said supplementary rail track section being selectively securable in fixed alignment with either said platform rail track section or said fixed rail track section.

* * * * *